June 29, 1937.  R. S. JOHNSTON  2,085,431
COATED WELDING ELECTRODE
Filed May 5, 1934
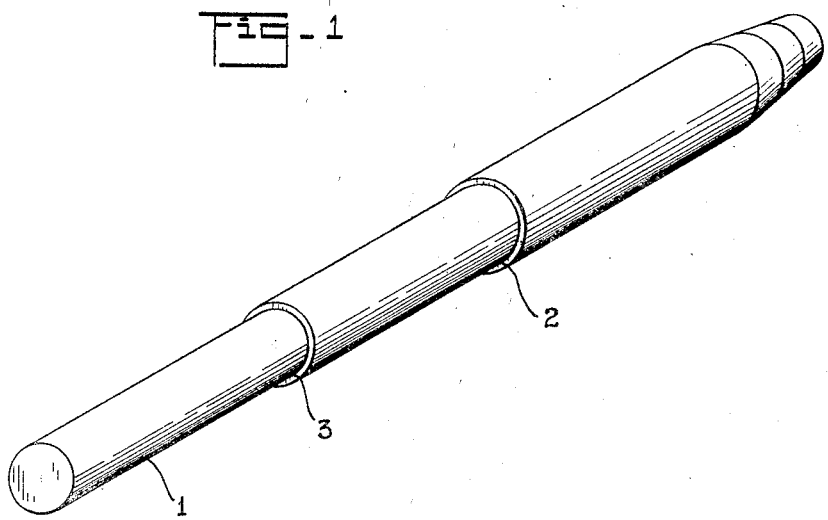
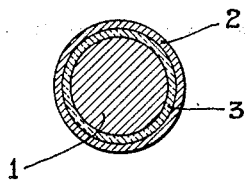
INVENTOR
Robert S. Johnston
BY
Philip Sawyer Rice & Kennedy
ATTORNEYS Patented June 29, 1937

2,085,431

UNITED STATES PATENT OFFICE 2,085,431

COATED WELDING ELECTRODE

Robert S. Johnston, Yardley, Pa., assignor to John A. Roebling's Sons Company, Trenton, N. J., a corporation of New Jersey Application May 5, 1934, Serial No. 724,192

3 Claims. (Cl. 91—68)

This invention relates to a process of producing coated welding electrodes.

While heretofore it has been considered advisable to make the coating of the welding rod homogeneous and of substantially uniform thickness, this has generally been for chemical and metallurgical reasons, and therefore the greatest exactness in uniformity of thickness or homogeneity has not been considered essential. I have discovered that unsteadiness of the arc at the end of the welding electrode is due, not alone to variations in composition and in rate of melting of the weld-regulating materials of the coating, but principally to differences in electrical conditions, brought about by variations in the dielectric resistance of the coating at different points in the same cross section, with the result that the current swings toward the side of weakest dielectric resistance and if this is near the end, the arc moves to the said weakest side and may break out laterally. Applicant has found that to produce a coating which will be substantially uniform in dielectric resistance requires a closer approach to absolute accuracy than has been attained heretofore or thought to be possible in commercial manufacture.

The object of the present invention is to provide a process which is capable of being carried out on a commercial scale at a reasonable cost and which will produce a welding rod having a coating of weld-regulating composition whose dielectric resistance is so nearly equal at all points that no objectionable fluttering or lateral shifting of the arc will occur, thereby enabling the welding operation to be carried out with greater ease and reliability than has been the case heretofore.

With this general object in view, the invention consists in the features and combination of steps hereinafter fully described and then particularly pointed out.

A welding electrode of the type produced by the process of the present invention is illustrated in the drawing in which,—

Fig. 1 is a perspective view of a welding electrode, a part of the coating and a part of the asbestos layer being removed, and Fig. 2 a cross sectional view of the completed electrode.

The welding electrode shown in the drawing comprises a rod of metal, 1, and a coating of weld-regulating composition, 2, carried by the rod. In the best embodiment of the invention there is a layer of asbestos or asbestos paper in contact with the metal rod as indicated at 3. The particular welding rod illustrated to explain the present invention is of the general type shown in my Patent No. 1,937,574, granted December 5, 1933, and the various compositions set forth in said patent are particularly suitable for carrying out the process of the present invention.

Assuming that the process is to be carried out with such a composition, the various solid ingredients are crushed and ground in the usual manner, either each ingredient separately or all together, as may be desired, and the resultant material is screened, only so much as will pass a screen of 100 mesh being used to carry out the process.

The ground and sifted material comprising the ingredients referred to above is mixed with a suitable liquid binder, such as silicate of soda to form a viscous fluid mass, which then is supplied to a colloidal mill to be ground to a very fine condition. The colloidal mill is adjusted with clearances of about four one-thousandths of an inch, but due to the high peripheral speed at which such a mill is run, and the small slit, the material is thrown centrifugally so that the impingement of material shears the particles through the fine slit and makes a very large proportion of an extremely fine particle size, some being as small as one ten-thousandth of an inch in diameter, and also produces a thorough intermixture of all the ingredients, thus resulting in such a great increase in the total surface area of the particles, that the composition in a wet and quite fluid condition, leaves the mill as a somewhat creamy or pasty mass, according to the viscosity desired. Into a body of this mass the metal rod, with its asbestos or asbestos paper coating, can be dipped and when withdrawn will have a thin layer of coating composition adhering to it, it being necessary to carry out the dipping in a special way, as particularly pointed out hereinafter.

Special attention must be given to the preparation of the metallic rod for dipping. This is because such rods are manufactured in great lengths and therefore must be coiled for convenience in further handling and transportation. In making the welding electrodes the material in a coil is run through a straightening device, comprising a plurality of rollers which are supposed to take all the coil out of the rod material and deliver it in a straight condition from which the rods are cut into the proper lengths. In the usual operation of these straighteners, the rods are straight enough for general purposes, but applicant has found that such rods are not truly straight, that is, true cylinders, and generally retain a slightly spiral form. While the amount of this spiral or departure from the truly cylindrical form is not enough to be noticeable except by careful test and very close inspection, it is enough to result in a grave disadvantage in a welding rod made in accordance with the process of the present invention, because it makes impossible the production of the truly uniform and concentric coating on the rod. The electric arc will reveal any such defect during welding operations by swaying over the welding spot in an undesirable manner.

It has been found, however, that if the straightening device is in substantially perfect condition, with good rollers having their peripheries concentric to their axes of rotation, and, if the rollers are carefully adjusted, with proper inspection of the rods and readjustment when necessary, a straightened product can be obtained in which the deviations from the truly cylindrical are so small as to be unimportant in the finished product. Of course, rod lengths not sufficiently true could be rolled back and forth under pressure, as for example, between two plates, but this involves an additional expense which can be entirely avoided by the use of a properly adjusted straightener as above explained.

The rods of the desired length having been obtained in their substantially true cylindrical form, either provided with an asbestos layer or bare as may be desired, are dipped into and withdrawn from the viscous fluid coating composition under special conditions hereinafter set forth.

The rods must be withdrawn truly vertically from the fluid coating material and most advantageously also should be dipped vertically into the material. As such accuracy of dipping and withdrawing cannot be obtained with certainty by mere manual work, a suitable dipping tool or machine which will guide the rod in a truly vertical line must be employed, as will be understood by those skilled in the art.

It has been found that the rate at which the rod is traveled down into the fluid coating composition must not be too rapid, because with a rapid movement air is carried down into the fluid and collects in bubbles on the rod, so as to prevent the fluid coming into close contact with the rod. Also the bubbles form hollows in the coating composition when it is dried, thereby defeating the object in view, namely, a coating of uniform dielectric resistance at all parts. Applicant has found that the entry of the rod into the coating at the rate of about one foot per second is entirely satisfactory and avoids any serious injury from air bubbles. At this speed, the fluid coating composition has time to wipe the rod free of air as the rod goes down into the fluid.

It has been found, also, that the rate of withdrawal of the rod from the fluid is important. That is, it must not be greater than a certain speed. The reason for this is that the surface tension between the rod and the fluid is such that the fluid will cling to the rod to a certain extent and is lifted above the level of the fluid as the rod rises. If the rate of lifting is not too rapid there will be a cone of coating composition clinging to the rod, the base of the cone being at the level of the fluid. This cone serves to wipe the rod as it rises, leaving on the rod a uniform coat of composition. If the rod is elevated from the fluid at too rapid a rate the cone breaks and particles of composition cling to and are elevated with the rod, forming beads or drops of composition thereon thus giving a lumpy rough coating. It has been found that the rate of elevating the rod in withdrawing should be susbtantially constant and not exceeding about one-half a foot per second.

The coating composition is of such fluidity or viscosity that it will cling to the rod and tend to spread itself uniformly over the surface of the rod, being helped by the wiping action of the cone of clinging material, hereinbefore referred to. As soon as the coating composition is elevated into the air it loses moisture and solidifies to a considerable extent. Hence, if the coating obtained by one dipping is not sufficient, the rod after a short time may be dipped again, and these steps may be repeated, if necessary, until the rod has accumulated a coating which, it is particularly to be noted, must be thicker than that required on the finished article in order to allow the removal of some of it, as hereinafter explained.

The number of dips required is determined, of course, by the viscosity of the fluid coating composition and the thickness of dielectric required on the finished product.

The rods must be maintained in their truly vertical position at all times during dipping and until after the coating has solidified and dried to a certain extent as hereinafter more fully explained, and while it is possible to dip the rods in one place and then carefully carry them to the dryer after a certain amount of solidification has taken place, it is important to have the dipping done in a compartment which is either a part of the dryer or connected therewith so as to have the same atmosphere as the dryer and to avoid all drafts of air on the freshly coated rods. The atmosphere in which the rods are maintained, at least during the drying, and, most advantageously, also during the dipping, must never have a humidity less than 55%. This atmosphere is heated, and the temperature and humidity should have a certain co-relation. In practice it has been found that a temperature of 70° F. and a humidity of 70% gives ideal results but requires that the rods be maintained in the dryer for about six hours.

During the first part of the drying, viz: for about two hours, the rods must still be maintained in the vertical position. At the end of that time the coating will seem to be perfectly dry, but if removed then to the normal outside air will develop cracks or "craze" resulting in injury to the final product. However, although the rods cannot be removed from the dryer at the end of the said two hours, they need no longer be retained in the vertical position but may be laid horizontaly and stacked if desired for the purpose of economizing space in the dryer and after remaining some time longer in the dryer, to-wit, about four hours, they can then be removed from the dryer with assurance that few, if any, will thereafter develop cracks in the coating. If, in order to speed up production, an attempt is made to use a higher temperature and less time in the dryer, it is very important to maintain the humidity at least at 70% and preferably somewhat more. For example, the dryer may be maintained at 108° F. and the humidity at 72% and satisfactory results will be obtained in the finished product and the rods need to be in the dryer only one and one-half hours.

As the fully dried coated rods come from the dryer, they will be found to have a coating which is substantially circular at any cross-section but of increasing diameter toward the lower end of the rod, viz: the end which was down when dipping the rod. In other words, the rod is not a true cylinder but is tapered or conical. This is because after the rod is dipped and hung up to allow the coating to set before removing it to the dryer, there is a certain slight downward flow or settling of the coating composition toward the lower end of the rod, which results in the coating being thinner at the top and thicker at the bottom.

While this difference in thickness of coating is not very great, it leads to annoyances during the welding operations because it necessitates an adjustment of the voltage on the arc as the welding rod is used up. Therefore, as a final step to produce the substantially perfect dielectric coating on the metal core, the properly dried rod is subjected to a grinding operation in a centerless grinder having a properly selected abrasive wheel, in order to grind, that is, abrade away the outside of the coating of the rod to leave a coating of a truly cylindrical shape. While this grinding may be a wet grinding process it can also be a dry grinding process, and the latter is preferable as it avoids further drying. Where the metal core is properly straightened as hereinbefore explained, the cylindrical outer surface of the coating will be concentric with the axis of the core at all cross-sections and hence the coating will be of substantially uniform thickness at all points. Since the coating composition is homogeneous, free from any crystals of appreciable size and free from air bubbles or cavities formed by air bubbles, the coating will be of substantially uniform dielectric resistance at all points. Such a rod gives a quiet steady arc and avoids the necessity for so much manual voltage regulation as the welding rod is used up.

What is claimed is:

1. The process of producing a welding rod with a coating of weld-regulating composition of uniform dielectric strength at every cross-section of the coating, which consists in dipping a cylindrical rod of the desired welding metal into a fluid mixture of coating composition while maintaining its axis vertical, slowly withdrawing said rod while maintaining its axis vertical, repeating the dipping and withdrawing steps until the rod has a coating whose thickness at every point is greater than that of the required final coating, drying the coated rod until said coating has solidified, and then grinding away the exterior material of the coating while allowing the coated rod to rotate about an axis parallel to the longitudinal axis of the rod, until the thickness of the coating remaining on the rod is that which is required and is uniform at all points.

2. The process of producing a welding rod with a coating of weld-regulating composition of uniform dielectric strength at every cross-section of the coating, which consists in dipping a cylindrical rod of the desired welding metal into a fluid mixture of coating composition while maintaining its axis vertical, slowly withdrawing said rod while maintaining its axis vertical, repeating the dipping and withdrawing steps until the rod has a coating whose thickness at every point is greater than that of the required final coating, drying the coated rod in a humid atmosphere until said coating has solidified, and then grinding away the exterior material of the coating while allowing the coated rod to rotate about an axis parallel to the longitudinal axis of the rod, until the thickness of the coating remaining on the rod is that which is required and is uniform at all points.

3. The process of producing a welding rod with a coating of weld-regulating composition of uniform dielectric strength at every cross-section of the coating, which consists in dipping a cylindrical rod of the desired welding metal into a fluid mixture of coating composition while maintaining its axis vertical, slowly withdrawing said rod while maintaining its axis vertical, repeating the dipping and withdrawing steps until the rod has a coating whose thickness at every point is greater than that of the required final coating, drying the coated rod in an atmosphere having a humidity of not less than 55 per cent, until said coating has solidified, and then grinding away the exterior material of the coating while allowing the coated rod to rotate about an axis parallel to the longitudinal axis of the rod, until the thickness of the coating remaining on the rod is that which is required and is uniform at all points.

ROBERT S. JOHNSTON.